United States Patent [11] 3,525,349

[72] Inventors Paul R. Scott
 Houston, Texas;
 Richard E. Christensen, Midland, Texas
[21] Appl. No. 753,771
[22] Filed Aug. 19, 1968
[45] Patented Aug. 25, 1970
[73] Assignee Shell Oil Company
 New York, New York
 a corporation of Delaware

[54] CONTROL OF GYPSUM DEPOSITS FROM SUPERSATURATED GYPSUM SOLUTIONS
 7 Claims, No Drawings
[52] U.S. Cl. .......................................................... 137/1
[51] Int. Cl. .......................................................... C02b 5/00
[50] Field of Search .......................................... 137/1, 13, 15; 263/53A

[56] References Cited
UNITED STATES PATENTS
3,096,777  7/1963  Parks ........................... 137/1X Primary Examiner— Alan Cohan
Attorney— George G. Pritzker and J. H. McCarthy ABSTRACT: A method of transporting supersaturated aqueous gypsum solutions through conduits such as pipelines without deposition of gypsum on the conduit walls thereby preventing plugging of the conduits, or removing such deposits from conduit walls by injecting into the conduit transporting supersaturated aqueous gypsum solutions, and maintaining therein a small amount of an aqueous sodium chloride solution.

CONTROL OF GYPSUM DEPOSITS FROM SUPERSATURATED GYPSUM SOLUTIONS

BACKGROUND OF THE INVENTION

This invention relates to a method of preventing and/or removing gypsum deposits from conduit walls such as pipelines while transporting through said conduits generally over great distances supersaturated gypsum (calcium sulfate) solutions also generally containing electrolytes. More particularly, the present invention is directed to the prevention, control and removal of gypsum deposits from pipelines transporting over great distances solutions supersaturated with gypsum (calcium sulfate) by injecting into said pipelines a small amount of sodium chloride solution sufficient to effect these results.

It is well known in the art that pipeline transportation of gypsum solutions and particularly supersaturated gypsum solutions is a troublesome problem because of the tendencies of such solutions to deposit gypsum ($CaSO_4 \cdot 2H_2O$ and/or $CaSO_4$) on the walls of pipelines causing plugging of the lines even at normal pipeline temperatures.

The causes of gypsum deposition on pipeline walls from water supersaturated with gypsum is not clearly understood but is believed to be caused by the presence of crystals of solid gypsum which act as seed material for gypsum deposition. These crystals are believed to become trapped and cemented in the rough places in the pipe wall and with time grow into large crystals which cause plugging of the line and prevent liquid flow. Although gypsum precipitates very slowly at normal pipeline temperatures (65–95°F.) when very few sites for crystal growth are present, even if the water is supersaturated, nevertheless when many such sites are present the excess gypsum tends to drop out rapidly and cause plugging. Thus, the deposition and build up of crystals in a pipeline carrying supersaturated water although slow at first, increases with time as more and more crystals are present to cause more rapid deposition. Another factor causing deposition is that as the water travels through the pipeline the water becomes more supersaturated because the water cools and is able to deposit more gypsum. Other factors which influence gypsum deposition are the disturbance of the ionic balance of such solutions as well as changes in temperature and pressure of these solutions. Decrease in pressure causes decrease of gypsum solubility in water.

Various methods of preventing and removal of gypsum deposits have been proposed in the art but these have been found to be both costly and ineffective. Thus, use of mechanical means such as scrapers or explosives such as string shot have been used but such methods are time consuming, generally ineffective and dangerous. Also, the use of acids such as HCl has been proposed but this presents a corrosion and handling problem.

Another method for removing gypsum deposits is by modification of the gypsum deposits by chemical means such as by use of chelating agents or conversion agents which convert the gypsum to calcite ($CaCO_3$) which is then removed by acidization. Prevention of gypsum deposition by precoating the pipelines with chemicals has been also proposed but this is economically unsound and not very effective since in most cases effective chemicals present a corrosion problem. The addition of phosphate compounds is a technique well known to those who practice the art of preventing gypsum deposition from water solution. This method is expensive and becomes ineffective in large water systems because of the long time period the water remains in the system and the presence of contaminants which reduce the effectiveness of these compounds.

The problem of preventing and removal of gypsum deposits from supersaturated gypsum (calcium sulfate) water solutions containing also a variety of electrolytes is an extremely important one particularly in areas where any kind of water is at a premium and also because of its increasing importance for use in various commercial applications such as in waterflooding operations for oil recovery where the water need not be pure as for use as a driving fluid or for other industrial purposes.

An object of the present invention is directed to the removal of gypsum deposits from conduit walls, e.g., pipe walls, caused by precipitation thereon of gypsum from supersaturated aqueous gypsum solutions.

Another object of the present invention is the prevention of gypsum deposits in pipe walls from supersaturated aqueous gypsum solutions.

Still another object of the present invention is the pipeline transportation of supersaturated aqueous gypsum solutions without causing plugging of the line due to gypsum depositions and which is free flowing and not predisposed to deposit formations.

Other objects of the invention will be apparent from the following description.

SUMMARY OF THE INVENTION

The above and other objects of the present invention are attained by increasing the sodium chloride content of the final solution by from less than 1 percent to about 5 percent by weight sodium chloride by adding, admixing or injecting a small amount of an aqueous sodium chloride solution into a supersaturated aqueous gypsum solution and preferably one containing additional water-soluble electrolytes such as alkali metal halides as well as other salts which solution generally on contact with conduit surfaces tends to deposit gypsum thereon thus causing plugging.

Also, the present invention is directed to the removal of gypsum deposits from conduit walls by contacting such deposits with a dilute aqueous sodium chloride containing from less than 1 percent to about 5 percent by weight sodium chloride. Such solutions can be preferably dilute sodium chloride brines. Thus, it has been found that by addition of about 1000 to 5000 ppm of sodium chloride to water supersaturated with gypsum being transported through a pipeline under normal pipeline temperature (65–95°F) will prevent gypsum depositions or remove gypsum and gypsum bearing deposits from pipe walls in contact with supersaturated gypsum solutions such as water supersaturated with gypsum and containing also from 0 to 150,000 ppm of electrolytes such as NaCl, KCl and the like.

The sodium chloride solutions which are added to supersaturated gypsum solutions to prevent or remove gypsum deposits can be brine solutions or can be made by adding to fresh water sodium chloride or by injecting fresh water into a salt formation and recovering a brine solution therefrom. Any and all of such brine solutions can be used for the purpose of the present invention.

PREFERRED EMBODIMENTS OF THE INVENTION

To illustrate the effectiveness of the process of the present invention to remove and/or prevent gypsum deposits on conduit walls coming in contact with supersaturated gypsum solutions the following examples are noted.

Example I

To a water solution containing 3530 ppm of $CaSO_4$ and 3000 ppm of NaCl which is supersaturated with respect to $CaSO_4$ and deposits $CaSO_4$ on pipe walls as the solution flows through the pipeline, about 2000 ppm of NaCl as a water solution was injected into the system and $CaSO_4$ deposits were dissolved and further $CaSO_4$ deposition was prevented.

Example II

In a field test in which water from West Texas Water Supply System containing about 2500 ppm NaCl and other salts and about 2900 ppm gypsum ($CaSO_4 \cdot 2H_2O$) and which is supersaturated with respect to gypsum was transported through a 10-inch transite pipeline and a very heavy gypsum deposit build up was noted. About 3000 ppm (0.3 percent) of sodium chloride solution was injected into the pipeline while the supersaturated water was flowing so that the total NaCl content of the water was 5500 ppm. The addition of the sodium chloride solution removed the gypsum deposit from the pipe within about two weeks.

Example III

To a heavy gypsum deposited pipeline transporting well water supersaturated with gypsum ($CaSO_4 \cdot 2H_2O$) was added about 3000 ppm of NaCl solution and visual inspection showed that 70 to 80 percent of previous gypsum deposit was removed and about 90 percent of the gypsum was removed from the top two-thirds of the pipe circumference. Deposits of iron sulfide, sand and other solid materials in the bottom one-third of the pipe hindered removal of the remaining gypsum in this area.

Example IV

The use of available gypsum solvents such as highly caustic solutions, e.g., Champion Chemical Gypton M—29 which is a highly caustic solution containing NaOH, KOH and trisodium phosphate for removing gypsum deposits as well as other organic chemicals, are generally hazardous to use, ineffective and costly. Thus, adding Gypton M—29 to remove gypsum deposits from pipelines results in the breaking up of the gypsum deposits into particles which are relatively insoluble in water or acids and are difficult to remove as shown in Table 1.

TABLE 1.—EFFECT OF GYPTON M-29 ON SOLUBILITY OF GYPSUM IN WATER SOLUTIONS[1]

| Sample No. | Solid gypsum added, gms. | Distilled water, ml. | Gypton M-29 Ml. | Gypton M-29 Percent w | pH | Gypsum in solution after agitating 24 hours, gm. |
|---|---|---|---|---|---|---|
| 1 | 3 | 175 | 0 | 0 | 7.6 | 2,640 |
| 2 | 3 | 166.25 | 8.75 | 5 | 13.6 | 760 |
| 3 | 6 | 157.5 | 17.50 | 10 | 13.8 | 370 |
| 4 | 6 | 140 | 35.0 | 20 | 13.9 | 93 |

[1] Gypton appears to be concentrated caustic with a surface-active agent. Probably KOH, NaOH and $Na_3PO_4$.

On the other hand the use of dilute brine solution effectively solubilized and removed gypsum deposits as shown by the data presented in Table 2.

TABLE 2.—GYPSUM SCALE REMOVAL FROM WEST TEXAS SUPERSATURATED GYPSUM WATER SUPPLY SYSTEM GATHERING LINES

Gypsum ($CaSO_4 \cdot 2H_2O$) = 2.32 gm./ml. = 145 lb./ft.$^3$
Area of 10-inch pipe = 2.5 ft.$^2$/ft.

| Gypsum ($CaSO_4 \cdot 2H_2O$), thickness, in. | Gypsum ($CaSO_4 \cdot 2H_2O$), ft.$^3$ | Gypsum ($CaSO_4 \cdot 2H_2O$), lb./ft. | Gypsum ($CaSO_4 \cdot 2H_2O$), lb./100 ft. |
|---|---|---|---|
| 1/8 | 0.027 | 3.9 | 390 |
| 1/4 | 0.054 | 7.8 | 780 |
| 1/2 | 0.108 | 15.7 | 1,570 |
| 3/4 | 0.162 | 23.5 | 2,350 |
| 1 | 0.216 | 31.3 | 3,130 |

Fresh water containing salt (NaCl) required to dissolve $CaSO_4 \cdot 2H_2O$ from 100 feet of 10-inch pipe.

| Bbls. water containing various salt contents, lb. bbl.: | $CaSO_4 \cdot 2H_2O$ thickness, in. 1/8 | 1/4 | 1/2 | 3/4 | 1 |
|---|---|---|---|---|---|
| 0 | 420 | 850 | 1,700 | 2,550 | 3,400 |
| 5 | 240 | 480 | 970 | 1,450 | 1,930 |
| 10 | 195 | 390 | 780 | 1,180 | 1,560 |
| 15 | 170 | 340 | 680 | 1,023 | 1,360 |
| 20 | 147 | 295 | 590 | 890 | 1,190 |
| 30 | 130 | 255 | 515 | 775 | 1,030 |

To show the economic advantages of inhibiting gypsum deposition by the process of the present invention over the use of conventional organic phosphate inhibitors used for this purpose, the following tests were made.

Example V

Gypsum deposition was made using supersaturated solutions at 77±4°F while in the presence of a large excess of solid gypsum from the West Texas Water Supply System. These tests were conducted in an environment which exceeds the severity of the environment of the West Texas Water Supply System. The six inhibitors which were used in this study had been used to prevent gypsum deposition from oil well brines and were recommended for possible use in the West Texas Water Supply System as shown in Table 3.

TEST PROCEDURE

A new blend of two salt solutions was prepared at the start of the testing time for each inhibitor. The resulting blends had chemical compositions similar to the West Texas Water Supply System water but with sufficient excess calcium ($Ca^{++}$) and sulfate ($SO_4$)$^{--}$ ions to represent about 700 p.p.m. $CaSO_4 \cdot 2H_2O$ supersaturation.

One hundred and fifty ml of the blend were added to each of five 200 ml magnesia bottles. The inhibitor to be tested was added to individual bottles to equal 0, 1, 2, 4 and 8 ppm.

Two grams of broken gypsum crystals were added to each bottle. These crystals were removed from the West Texas Water Supply System and contain about 5 percent by weight iron sulfide. (Iron sulfide has a deleterious effect on gypsum deposition inhibitors).

The magnesia bottles were rotated at 10 rpm in an EPR bottle rotator Mark II throughout a two-week time period.

Aliquots of each test solution were periodically filtered through Whatman No. 42 paper and then titrated with ethylene diamine titraacetic acid solution.

The water residence time in the West Texas Water Supply System is about 2 days; thus, one of the test criteria is that the inhibitor must prevent gypsum deposition for at least two days.

TEST RESULTS

The test results and conditions are summarized in Tables 3 and 4. The chemical costs to inhibit gypsum deposition under these test conditions were 0.3 mils/bbl and 0.6 mils/bbl, respectively, using Tretolite SP—175 and Visco 951. The cost to inhibit with sodium chloride was 0.2 mils/bbl. The test criterion used as the prevention of deposition for two days. The sodium chloride cost figure was derived from estimated cost of $65,000 for a brine well and an estimate of the quantity of salt which could be removed from a single well.

TABLE 3

Test Environment:
1. Temperature = 77±4° F.
2. Pressure = 0 p.s.i.g.
3. Gypsum Crystals = 12 gm./L (crystals from West Texas Water Supply System)
4. Agitation = constant for 14 days in EPR bottle rotator
5. Water Composition.
Component, p.p.m.:
  Ca as $CaSO_4 \cdot 2H_2O$, 3,620 (supersaturated by approx. 700 p.p.m.)
  $MgSO_4 \cdot 7H_2O$, 3,000.
  NaCl, 3,900.
  $Na_2SO_4$, 200.

| Chemical | Cost/gal. | Estimated effective dosage [1] p.p.m. | Mils/bbl. |
|---|---|---|---|
| Visco Div., Nalco Chem. Co., Visco 951 | 2.90 | 4 | 0.5 |
| Tretolite Div., Petrolite Corp., Tretolite SP-175 | 1.95 | 4 | 0.3 |
| Champion Chem. Inc., Gyptron T-27 | 3.10 | 10–12 | 1.3 |
| Baroid Div., National Lead Co., Surflo H-35 | 5.00 | 10–12 | 2.1 |
| Calgon Corp., S-31 | 3.67 | 16 | 2.5 |
| Betz Labs., Inc., Scalemaster 232 | 2.45 | >16 | >1.6 |
| Sodium chloride | ([2]) | 4,000 | 0.2 |

[1] Dosage necessary to prevent gypsum deposition for 2 days.
[2] (0.12 mils./lb.)

TABLE 4.—GYPSUM INHIBITOR EVALUATION DATA

| | Ca++ in Solution as p.p.m. CaSO₄·2H₂O after elapsed time in days | | | | | | | |
|---|---|---|---|---|---|---|---|---|
| | Days | | | | | | | |
| Inhibitor | 0 | 1 | 2 | 3 | 4 | 6 | 7 | 8 | 14 |
| None [1] | 3,620 | 3,220 | 3,160 | | 3,090 | | 3,080 | | 3,040 |
| Visco 951, p.p.m.: | | | | | | | | | |
| 1 | 3,620 | 3,460 | 3,290 | | 3,180 | | 3,100 | | 3,040 |
| 2 | 3,620 | 3,540 | 3,370 | | 3,200 | | 3,090 | | 3,040 |
| 4 | 3,620 | 3,620 | 3,640 | | 3,370 | | 3,190 | | 3,040 |
| 8 | 3,620 | 3,640 | 3,660 | | 3,720 | | 3,350 | | 3,090 |
| Tretolite SP-175, p.p.m.: | | | | | | | | | |
| 1 | 3,620 | 3,520 | 3,290 | 3,290 | | 3,140 | | 3,999 | [2] 3,080 |
| 2 | 3,620 | 3,600 | 3,530 | 3,350 | | 3,160 | | 3,090 | [2] 3,060 |
| 4 | 3,620 | 3,600 | 3,610 | 3,640 | | 3,620 | | 3,250 | [2] 3,100 |
| 8 | 3,620 | 3,610 | 3,660 | 3,700 | | 3,740 | | 3,500 | [2] 3,120 |
| Gyptron T-27, p.p.m.: | | | | | | | | | |
| 1 | 3,630 | 3,260 | | 3,140 | | [3] 3,090 | | [4] 3,080 | 3,040 |
| 2 | 3,630 | 3,450 | | 3,150 | | [3] 3,100 | | [4] 3,060 | 3,040 |
| 4 | 3,630 | 3,500 | | 3,320 | | [3] 3,260 | | [4] 3,080 | 3,040 |
| 8 | 3,630 | 3,600 | | 3,560 | | [3] 3,500 | | [4] 3,270 | 3,210 |
| Surflo H-35, p.p.m.: | | | | | | | | | |
| 1 | 3,620 | 3,420 | 3,180 | | 3,110 | | 3,090 | | 3,010 |
| 2 | 3,620 | 3,500 | 3,380 | | 3,130 | | 3,120 | | 3,050 |
| 4 | 3,620 | 3,570 | 3,460 | | 3,340 | | 3,260 | | 3,150 |
| 8 | 3,620 | 3,620 | 3,590 | | 3,490 | | 3,400 | | 3,270 |
| Calgon S-31, p.p.m.: | | | | | | | | | |
| 1 | 3,610 | 3,320 | 3,170 | | 3,080 | | 3,100 | | 3,040 |
| 2 | 3,610 | 3,420 | 3,140 | | 3,080 | | 3,090 | | 3,040 |
| 4 | 3,619 | 3,530 | 3,420 | | 3,150 | | 3,120 | | 3,060 |
| 8 | 3,610 | 3,580 | 3,510 | | 3,390 | | 3,300 | | 3,220 |
| Scalemaster 232, p.p.m.: | | | | | | | | | |
| 1 | 3,620 | 3,250 | | 3,080 | | [3] 3,060 | | [4] 3,040 | 3,020 |
| 2 | 3,620 | 3,440 | | 3,120 | | [3] 3,100 | | [4] 3,040 | 3,040 |
| 4 | 3,620 | 3,480 | | 3,160 | | [3] 3,120 | | [4] 3,050 | 3,040 |
| 8 | 3,620 | 3,580 | | 3,270 | | [3] 3,310 | | [4] 3,170 | 3,060 |
| Sodium chloride, p.p.m.: | | | | | | | | | |
| 1,000 | 3,620 | 3,290 | 3,240 | | 3,220 | | 3,230 | | 3,190 |
| 2,000 | 3,620 | 3,460 | 3,410 | | 3,400 | | 3,400 | | 3,370 |
| 4,000 | 3,620 | 3,580 | 3,610 | | 3,620 | | 3,610 | | 3,590 |
| 5,000 | 3,620 | 3,700 | 3,700 | 3,730 | | 3,730 | | | 3,740 |
| 8,000 | 3,620 | 4,020 | 4,040 | | 4,050 | | 4,080 | | 4,060 |

[1] Average of four samples.
[2] Thirteen days.
[3] Five days.
[4] Ten days.

To summarize, the present invention is directed to a process of preventing and removing gypsum deposits from conduit walls caused by the following factors:

a. calcium sulfate (dihydrate and anhydride) precipitation from supersaturated solution; and
b. the degree of supersaturation depends not only on the concentration of calcium and sulfate ions in solution and the temperature but also depends on the concentrations of sodium chloride and other salts.

That this deposit can be removed from pipe walls and other surfaces by:

c. addition of sodium chloride such as sodium chloride brine so as to make the supersaturated sulfate solutions undersaturated with respect to calcium sulfate; or
d. the deposition may be prevented by rendering a calcium sulfate solution undersaturated with respect to calcium sulfate, e.g., by addition of sodium chloride solution, e.g., brine.

The concentration of sodium chloride used to accomplish either (c) or (d) or both can be low. In general no more than 1.3 percent sodium chloride should be added to a flowing system for continuous control and removal of calcium sulfate deposits.

The foregoing description of the invention is merely intended to be explanatory thereof. Various changes in the details of the described method may be made, within the scope of the appended claims, without departing from the spirit of the invention.

We claim:

1. In a method of transporting supersaturated aqueous gypsum solution through a pipeline without plugging the pipeline with gypsum deposits comprising the steps of:
   a. flowing supersaturated aqueous gypsum solution through the line;
   b. admixing with solution (a) an amount of sodium chloride solution sufficient to prevent gypsum deposition on the pipeline wall; and,
   c. flowing the solution mixture of (a) and (b) to the terminal end of the line.

2. The method of claim 1 wherein the supersaturated solution is a water solution supersaturated with gypsum and the sodium chloride solution is brine.

3. The method of claim 2 wherein the brine solution is prepared by injecting fresh water into a salt dome and recovering therefrom a brine solution and injecting said solution such that the NaCl content is increased from 1—5 percent into the supersaturated gypsum solution to remove and prevent gypsum deposition on the pipeline walls.

4. The method of claim 2 wherein the supersaturated gypsum water solution contains electrolytes.

5. In a method of transporting water supersaturated with gypsum through a pipeline over great distances without plugging the pipeline with gypsum deposits comprising the steps of:
   a. flowing water supersaturated with gypsum through the line;
   b. injecting into the line intermittently a brine solution prepared by injecting fresh water into a salt dome and recovering therefrom a brine solution such that the NaCl content is increased from 1 to 5 percent sufficient to remove and prevent gypsum deposition on the pipe walls; and
   c. flowing the solution mixture of (a) and (b) to the terminal end of the line.

6. The method of claim 1 wherein free flowing of the solution mixtures through the pipeline without plugging it is accomplished by preventing deposition of gypsum on the pipeline walls by injection of solution of step (b) into solution of step (a).

7. The method of claim 1 wherein free flowing of the solution mixtures through the pipeline without plugging it is accomplished by removing deposition of gypsum on the pipeline walls by injection of solution of step (b) into solution of step (a).